United States Patent

[11] 3,579,023

[72] Inventor Morton H. Fox
Alhambra, Calif.
[21] Appl. No. 811,523
[22] Filed Mar. 28, 1969
[45] Patented May 18, 1971
[73] Assignee Honeywell Inc.
Minneapolis, Minn.

[54] CONTROL APPARATUS
7 Claims, 4 Drawing Figs.

[52] U.S. Cl. .......... 315/18, 340/347
[51] Int. Cl. .......... H01j 27/70
[50] Field of Search .......... 315/18; 340/347

[56] References Cited

UNITED STATES PATENTS

| | | | |
|---|---|---|---|
| 2,731,631 | 1/1956 | Spaulding | 340/347 |
| 3,302,033 | 1/1967 | Goodrich | 315/27TD |
| 3,403,286 | 9/1968 | Carlock | 315/18 |

OTHER REFERENCES

Lamoureux, Kleen, End Point Vector Generation System, IBM Tech. Discl. Bull., Vol. 6, No. 12, May 1964, pp. 19— 20.

Gundrum, Char. Size Control, IBM, Vol. 9, No. 7, Dec. 1966, pp. 819— 820.

Susskind, Analog-Digital Conversion Techniques, pp. 5—29 to 5— 37.

*Primary Examiner*—Rodney D. Bennett, Jr.
*Assistant Examiner*—Joseph G. Baxter
*Attorneys*—Charles J. Ungemach, Ronald T. Reiling and Charles L. Rubow

ABSTRACT: A high-speed digital deflection switch system incorporating a digital-to-analog conversion circuit comprising a plurality of resistors in a ladder network which are switched into and out of the circuit by digital input signals for providing current changes through a magnetic deflection coil. This circuitry is accompanied by linearizing capacitors to produce a more constant deflection rate and further includes a circuit for changing the character size from large to small letters.

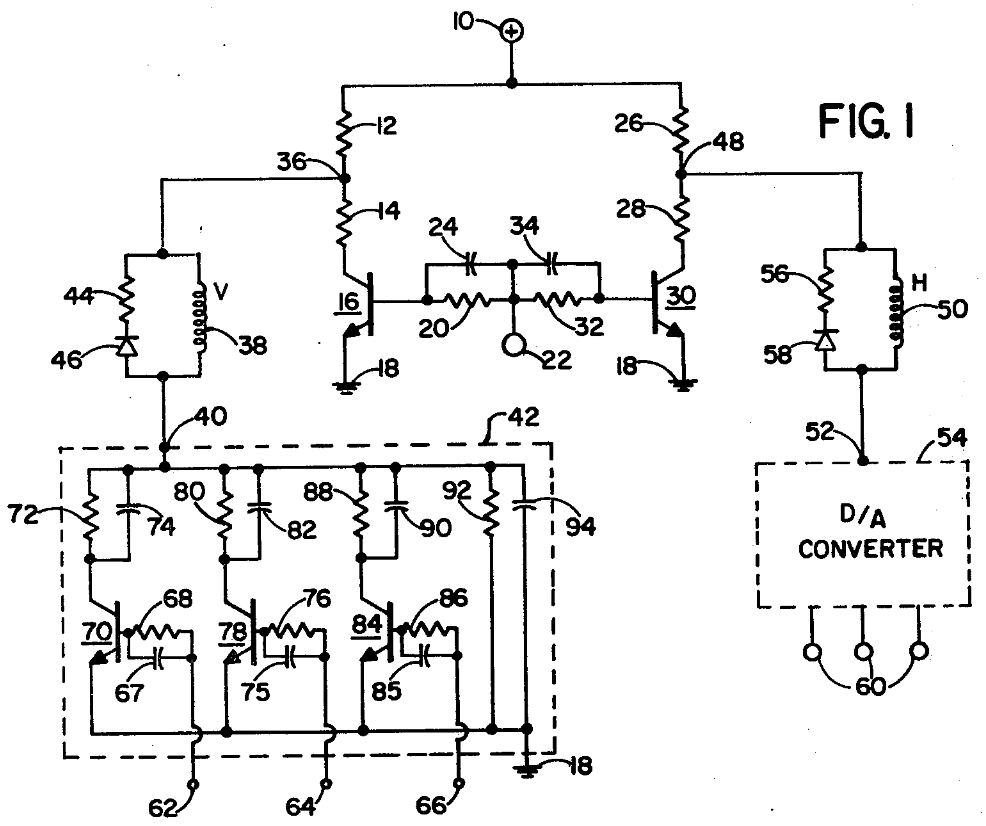
FIG. 1
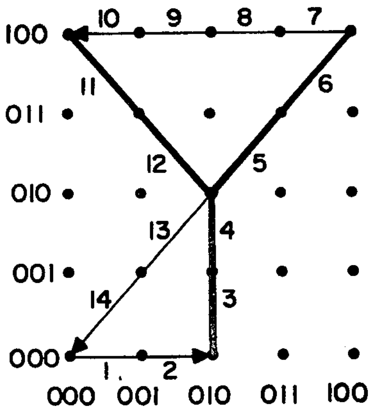
FIG. 2
| # | B | H | V |
|---|---|---|---|
| 1 | 1 | 001 | 000 |
| 2 | 1 | 010 | 000 |
| 3 | 0 | 010 | 001 |
| 4 | 0 | 010 | 010 |
| 5 | 0 | 011 | 011 |
| 6 | 0 | 100 | 100 |
| 7 | 1 | 011 | 100 |
| 8 | 1 | 010 | 100 |
| 9 | 1 | 001 | 100 |
| 10 | 1 | 000 | 100 |
| 11 | 0 | 001 | 011 |
| 12 | 0 | 010 | 010 |
| 13 | 1 | 001 | 001 |
| 14 | 1 | 000 | 000 |
FIG. 3
| # | B | H | V |
|---|---|---|---|
| 1 | 1 | 010 | 000 |
| 2 | 0 | 010 | 010 |
| 3 | 0 | 100 | 100 |
| 4 | 1 | 000 | 100 |
| 5 | 0 | 010 | 010 |
| 6 | 1 | 000 | 000 |
FIG. 4
INVENTOR.
MORTON H. FOX
BY Bruce C. Lutz
ATTORNEY

CONTROL APPARATUS

The present invention is directed generally to electronic apparatus and more specifically to digital-to-analog deflection systems for displays.

The prior art has utilized digital-to-analog converters which operate through linear power amplifiers, or pulse integration apparatus or both in combination to produce the deflection signal for a CRT or other display. The linear power amplifiers, in some embodiments, compare the ordered beam position with the actual position in terms of deflection current, and modify the amplifier output so that the electron beam travels to its newly ordered position in a close approximation of a straight line. In the pulse integration technique, voltage pulses of either fixed amplitude and variable duration, or fixed duration and variable amplitude are impressed on a yoke coil. Due to its inductance, the yoke integrates these pulses into approximated linearly increasing (or decreasing) yoke currents.

It will be realized by those skilled in the art that a linear power amplifier is slower in operation than the switch system of the present invention because it is always possible to make a switch that operates more quickly than any given amplifier. Further, an amplifier will dissipate larger amounts of power than a comparable switching circuit, since its operation will be within the linear region of its active components, while a switch operates only in the saturation and cutoff areas. Further, a linear power amplifier also must be provided with a digital-to-analog converter so that it will accept digitally specified commands. The lower reliability and higher costs of an amplifier system along with its larger number of components prove to be a great disadvantage at times.

The pulse integration technique, while basically a switching system, is not a position command system although it is faster than a linear power amplifier in operation. As an integration system, the accuracy of this type of technique depends on precise pulse timing and amplitude control and is subject to serious component aging, temperature, and power supply drift effects. To operate from digital command, the system must be provided with digital-to-pulse width or digital-to-pulse amplitude conversion capability.

The present invention on the other hand utilizes a ladder-type digital-to-analog converter connected directly to the deflection coils and connected in series therewith between the power supply terminals. The resulting system has fewer components and thus is more reliable and more economical than the above described systems. Since it is driven directly by the digital command signals there is no need for separate signal conversion. Since the operation is by switching, very fast results are obtained and the completion of the switching operation is limited only by the internal characteristics of a particular display coil. Because of the design of the present unit, the character size can be simply controlled by varying the supply voltage. Further, since switches are relatively unaffected by parameter changes, in contrast to the components used in pulse width integration apparatus and linear power amplifiers, few errors arise in the output signals due to such changes.

It is therefore an object of the present invention to provide an improved digital deflection switch system.

Further objects and advantages of the present system will be apparent from a reading of the specification and appended claims in conjunction with the drawings wherein:

FIG. 1 is a schematic block diagram of a preferred embodiment of a digital deflection switch system;

FIG. 2 is a visual display of the letter Y;

FIG. 3 is one presentation of the digital input signals needed to produce the letter Y of FIG. 2; and FIG. 4 is another presentation of digital input signals for producing the letter Y of FIG. 2.

DETAILED DESCRIPTION

In FIG. 1 a positive power terminal 10 supplies current through a pair of series connected resistors 12 and 14 to a collector of an NPN transistor 16 having its emitter connected to ground 18 and its base connected through a resistor 20 to a signal input terminal 22. A capacitor 24 is connected in parallel with resistor 20. Terminal 10 is also connected through a pair of series resistors 26 and 28 to a collector of an NPN transistor 30 having its emitter connected to ground 18 and its base connected through a resistor 32 to input terminal 22. A capacitor 34 is connected in parallel with resistor 32. A junction point 36 between resistors 12 and 14 is connected through a vertical deflection coil 38 to a junction point 40 which is an input to a dash line block 42 generally designating a vertical digital-to-analog conversion circuit. In parallel with coil 38 is a series combination of a resistor 44 and a diode 46 connected to prevent large transient back EMF voltages. A junction point 48 between resistors 26 and 28 is connected through a horizontal deflection coil 50 to an input 52 of a horizontal digital-to-analog conversion circuit 54. A resistor 56 is connected in series with a diode 58 across the coil 50 to prevent large back EMF voltages.

Conversion circuit 54 has a plurality of digital signal inputs 60 for receiving digital signals indicative of the deflection in the horizontal direction. Block 42 also has a plurality of digital signal inputs numbered respectively 62, 64, and 66. Input terminal 62 is connected through a parallel combination of a capacitor 67 and a resistor 68 to a base of an NPN transistor generally designated as 70 and having an emitter connected to ground 18. The collector of transistor 70 is connected through a parallel combination of a resistor 72 and a capacitor 74 to junction point 40. Input 64 is connected through a parallel combination of a capacitor 75 and a resistor 76 to a base of a transistor 78 having an emitter connected to ground 18. The collector of transistor 78 is connected through a parallel combination of a resistor 80 and a capacitor 82 to junction 40 in a manner similar to that of transistor 70. Likewise, a transistor 84 is connected at its base to input 66 through a parallel combination of a capacitor 85 and a resistor 86, and is connected at its emitter to ground 18, and at its collector through resistor 88 and capacitor 90 to junction point 40 in the same fashion as previously described. In addition there is shown a resistor 92 and a capacitor 94 connected in parallel between junction point 40 and ground 18.

While only three digital signal switches are shown, it will be realized that many more identical circuits can be added in accordance with the division of presentation lines required and the number of digital input signals used. In one embodiment of the present invention the signals used were binary. Thus the resistance of resistor 80 was half that of resistor 72 while the resistance of resistor 88 was half that of 80. The resistor 92 in combination with capacitor 94 is used for the elimination of inductive transients and may be removed if slight nonlinearities in the current change through coil 38 are not objectionable.

In FIG. 2 a five-by-five matrix is shown for displaying numerals or other characters. In this matrix, blanked movements of the beam are shown by light lines with arrowheads on the ends thereof, and unblanked are shown by darker lines. Each separate movement of the beam is designated by an appropriate number and corresponds to the numerical sequence of digital input signals required for the letter Y as shown in the presentation on FIG. 3.

In FIG. 3 the first column is a listing of the particular step being taken for presentation of a letter while the second column is the blanking signal. The blanking signal may be applied to the brightness grid not shown in the present circuit, but provision thereof would be obvious to anyone skilled in the art. The third column shows the horizontal axis digital inputs for a binary system having three digital inputs such as is shown in FIG. 1. As will be realized, the system shown can provide a seven-by-seven matrix presentation but only five were believed necessary for illustrating the invention. The fourth column, of course, shows the vertical axis digital input signals necessary for visually displaying the Y of FIG. 2.

In FIG. 4 a presentation similar to that of FIG. 3 is shown except that larger-than-single matrix steps are shown. In other words, each straight line movement is taken in one step. This type of presentation is not always desirable but can be used where constant rate deflection systems are used or where the width of the presentation display line is not significant. Further, a combination of the presentation commands of FIGS. 3 and 4 can be used where the blanked signals are moved the desired distance in one direction and the unblanked signals are moved one step at a time.

OPERATION

Referring first to FIG. 2, it will be realized that, in order to provide a visual display from digital signals, the display line or beam, such as is found in a CRT, must be moved by increments. In other words, the first input signal requires movement of the beam from the lower left hand corner of FIG. 2 to the first dot along the path shown by line 1. Since this is not part of the presented character, the beam should be blanked as shown in FIG. 2. The second input signal places the beam, after movement, at the center of the lower row. At this time there is still no visible display since the beam is being blanked while being moved. The third input signal however moves the beam up one space immediately after unblanking the signal thereby allowing it to be presented. The fourth input signal moves the beam up another space, and on the fifth input signal the beam is moved both vertically and horizontally to produce a diagonal. The rest of the movements will be obvious from a study of FIGS. 2 and 3.

In order to obtain the linear display beam movements shown in FIGS. 2 and 3, the circuitry of FIG. 1 was devised. To obtain the movement of line 1 an input is supplied to the first input of block 54 corresponding to that of 62 in block 42. The second command produces an input signal at the second input instead of the first input of block 54. The third command maintains the input signal in block 54 and applies a signal to input 62 of block 42. This turns on transistor 70 thus causing a current to flow from supply 10 through resistor 12, coil 38, resistor 72, and transistor 70 to ground 18. The remaining steps in moving the beam are apparent from the listing of FIG. 3 and will not be discussed in detail. Capacitor 74 is not needed for circuit operation, but it has been determined that the use of capacitor 74 will linearize the current flow change through coil 38. Capacitor 74 is picked such that the deflection current or slope approaches (E/L) or the supply voltage of terminal 36 with respect to ground 18 divided by the inductance of coil 38. When the capacitive value is properly selected, its charge will be sufficiently high to effectively take it out of the circuit when the current reaches E divided by the other circuit impedances. Thus, the current will rise until this level is reached and then stabilize to a substantially constant value. It has been proven mathematically that the exponential charge of the capacitor almost completely compensates for the opposite exponential change in current due to the inductance of coil 38.

As will be realized by those skilled in the art, applying a voltage across an inductor results in an initially low current due to back EMF. This current increases until it is substantially equal to the voltage divided by the internal inductor resistance. The current, in other words, at the end of a long period of time is very high. A capacitor on the other hand initially has a high amount of current flowing therethrough. This high amount of current gradually tapers off to zero. Utilizing the two charging or current flow characteristics in a series connected circuit will produce complementary results such that the current change through the coil 38 is substantially linear. Of course, the resistor 72 does not allow the capacitor 74 to provide total compensation since there will be current flowing through resistor 72 at all times transistor 70 is on. However, the linearization does produce a much better presentation and decreases the switching time necessary to move the beam from one spot to another on the display.

The previously mentioned resistor 92 and capacitor 94 serve a damping function to prevent inductive transients due to current changes in coil 38 from being observed on the display. The resistor 92 assures that there will always be a small amount of current flowing through the coil 38 and capacitor 94 tends to supply a small amount of current for initial changes and damps out "instability" in the system.

The resistor 44 and diode 46, of course, prevent reverse EMFs from destroying the transistors 70, 78 and 84 in a manner known in the prior art. The circuit utilizing transistors 16 and 30 includes different size resistors 12 and 26 in a preferred embodiment of the invention. This circuit supplies different voltages to the two coils 38 and 50 in conjunction with their respective digital-to-analog converters 42 and 54. Thus, the presentation as shown will be higher than it is wide in accordance with the manner in which characters are generally written in the English language. When it is desired to go from a capital letter to a small letter, the relative voltages for both the vertical and horizontal coils are changed proportionately. This is accomplished by supplying a signal to input terminal 22 to turn normally OFF transistors 16 and 30 to an ON condition and provide current paths through resistors 14 and 28 to ground 18, thus lowering the voltage available at terminals 36 and 48 which is supplied to the vertical and horizontal deflection coils.

While the present system may be used with enough switches in the digital-to-analog converters 42 and 54 to cover the entire digital-to-analog display, this would tend to be inefficient since the high speed obtainable with the present circuit is not necessary for slow movements suitable for positioning each particular character on the display. Thus, normally the present circuit is used in conjunction with another set of vertical and horizontal deflection coils which are used to provide the main position display of the individual characters. In other words, the main system determines the location on the display at which the lower left hand corner of the matrix of FIG. 2 is to be presented.

Capacitors 24, 34, 67, 75 and 85 are speed-up capacitors and are not necessary in all embodiments of this circuit.

While one embodiment of the present invention has been described and explained, it is to be realized that other embodiments of the invention will be apparent to those skilled in the art. The matrix may have a central starting position by using separate up, down, right and left coils with a down and left bias for small letters. The voltage-switching circuit or variable voltage supply means comprising transistors 16 and 30 may be easily replaced by two potentiometers connected to a single supply, or two separate supplies which can be changed in output voltage. Similarly, the switches shown as transistors 70, 78 and 84 may be replaced by other types of electronic or mechanical switches. Further, while capacitors 74, 82 and 90 are useful for providing optimum display presentations, they are not necessary in all instances. Therefore, I wish to be limited only by the scope of the appended claims wherein:

I claim:

1. Apparatus for producing a visual display formed of a plurality of linear display segments produced in response to digital signals, the apparatus including a cathode-ray tube having vertical and horizontal beam deflection coils each having first and second ends, the apparatus comprising:

power supply means including first and second terminals for supplying current to circuitry connected therebetween;

first and second digital-to-analog conversion means, each having input terminal means and first and second further terminals, each digital-to-analog conversion means comprising a plurality of switchable current paths connected in parallel between the first and second further terminals, each current path including only passive elements and a series-connected switch having a control terminal connected to the input terminal means, the switch conducting current only in response to an appropriate digital signal at the input terminal means, the first further terminals of said first and second digital-to-analog conversion means connected directly to the first ends of the horizontal and vertical deflection coils respectively, the second farther terminals of said first and second digital-to-analog conversion means connected directly to the first terminal of said power supply means; and connecting means for connecting the second ends of the horizontal and vertical deflection coils to the second terminal of said power supply means, said connecting means including only passive elements in current paths between the second terminal of said power supply means and the second ends of the horizontal and vertical deflection coils.

2. Apparatus for producing a visual display formed of a plurality of linear display segments generated in response to digital signals, the apparatus including a cathode-ray tube with a magnetic beam deflection coil having first and second ends, the apparatus comprising:

power supply means including first and second terminals for supplying current to circuitry connected therebetween;

digital-to-analog conversion means having input terminal means and first and second further terminals, said digital-to-analog conversion means comprising a plurality of switchable current paths connected in parallel between the first and second further terminals, each current path including only passive elements connected in series with a switch having a control terminal connected to the input terminal means, the switch conducting current only in response to a predetermined digital signal at the input terminal means, the first further terminal of said digital-to-analog conversion means being connected directly to the first end of the deflection coil, the second further terminal of the digital-to-analog conversion means being connected directly to the first terminal of said power supply means; and connecting means for providing a current path between the second end of the deflection coil and the second terminal of said power supply means, the current path including only passive elements.

3. The apparatus of claim 2 wherein the current paths in said digital-to-analog conversion means each include a capacitor having the value required to produce a substantially linearly increasing current through the deflection coil until a predetermined current therethrough is reached.

4. The apparatus of claim 3 wherein the current paths in said digital-to-analog conversion means each include a resistor connected in parallel with the capacitor in the current path.

5. The apparatus of claim 4 wherein:

said power supply means is operable to produce a voltage of value V between the first and second terminals thereof;

the resistor in each current path in the digital-to-analog conversion means has a preselected value; and the value of the capacitor in each current path is chosen so that the capacitor becomes substantially fully charged when the current in the deflection coil reaches a value slightly less than V divided by the value of the resistor in the current path.

6. The apparatus of claim 5 further including means cooperating with said connecting means for altering the voltage supplied to the deflection coil to change the beam deflections produced by given signals at the input terminal means of said digital-to-analog conversion means.

7. The apparatus of claim 6 wherein said connecting means and said means cooperating therewith includes:

a resistor connected between the second terminal of said power supply means and the second end of the deflection coil; and a resistor and a switch connected in series between the second end of the deflection coil and the first terminal of said power supply means, said switch operable to provide a current path between the second end of the deflection coil and the first terminal of said power supply means in response to a control signal.